April 10, 1956   R. D. ROWLANCE   2,741,060
LIVE BAIT HARNESS FOR FISHHOOKS
Filed Jan. 28, 1955
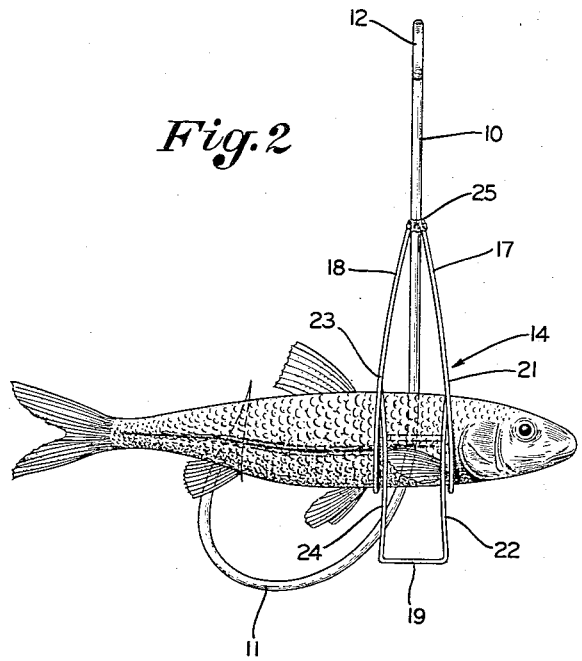
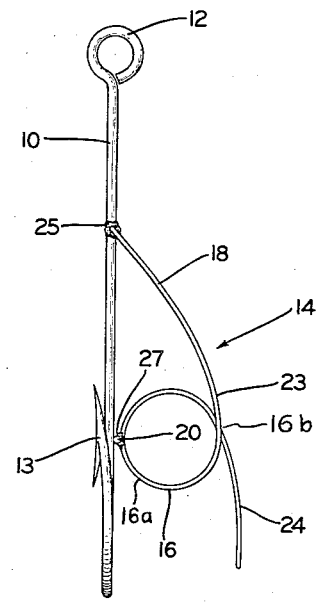
Fig. 3
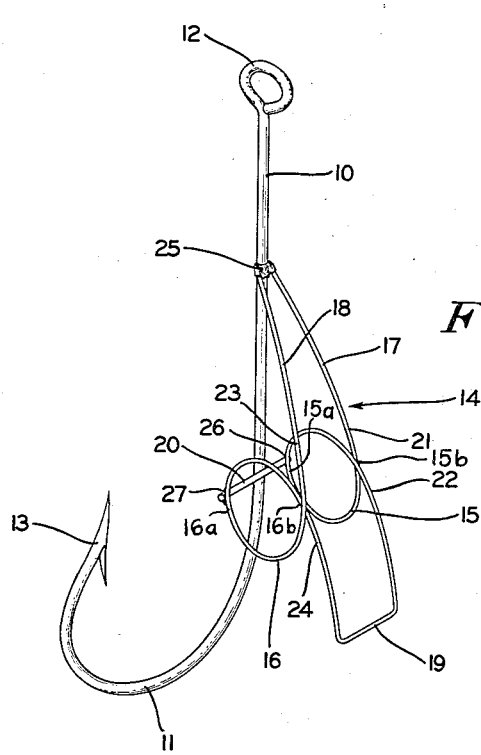
Fig. 1
INVENTOR.
Ralph D. Rowlance
BY
Frease & Bishop
ATTORNEYS

United States Patent Office 2,741,060
Patented Apr. 10, 1956

2,741,060

LIVE BAIT HARNESS FOR FISHHOOKS

Ralph D. Rowlance, Canton, Ohio

Application January 28, 1955, Serial No. 484,809

8 Claims. (Cl. 43—44.4)

My invention relates to improvements in live bait harnesses for fishhooks and more specifically to a live bait harness for fishhooks which retains the bait adjacent the hooked portion of the hook without the necessity of piercing the bait with the hooked portion.

Some prior constructions of live bait harnesses for fishhooks include various devices which retain the live bait on the fishhook but which require that the bait be pierced by the hooked portion of the fishhook to retain the bait properly positioned thereon. The principal difficulty with this construction of live bait harness is that it is difficult to pierce the live bait with the hooked portion of the hook without killing the bait, or at least causing the bait to die after being retained therein for a short period of time. Thus, a considerable amount of live bait is wasted and also a considerable amount of time is consumed in changing the bait, in order that there always be live bait retained on the hooked portion of the fishhook.

Other prior constructions of live bait harnesses include constructions of cages, such as spiral wire cages having spirals decreasing in diameter from the center of the cage outwardly to the ends of the cage, with these cages being positioned adjacent the hooked portion of the fishhook. Although, this cage construction of minnow harness is an improvement over those constructions requiring the bait to be pierced by the hooked portion of the fishhook, since there is no danger of killing the live bait once it has been properly positioned within the cage portion of the harness, this cage construction of harness still presents certain difficulties.

One difficulty with this cage construction of live bait harness is that it is difficult to insert the live bait therein, frequently requiring both hands of a fisherman to retain the harness in open position so that another fisherman may place the live bait therein. Thus, there must be at least two fishermen when this cage construction of bait harness is used. A further difficulty with this construction of harness is that a considerable amount of time is frequently consumed during the operation of inserting live bait therein, and the greater length of time that it is necessary to handle the live bait and retain this bait out of water, the more chance that the live bait will be permanently injured and die after a short period of time.

It is therefore a general object of the present invention to provide a live bait harness for fishhooks which eliminates the stated disadvantages and difficulties of the prior constructions.

It is a primary object of the present invention to provide a live bait harness for fishhooks which retains the bait properly positioned adjacent the hooked portion of the fishhook but does not require the bait to be pierced by the hooked portion.

It is a further object of the present invention to provide a live bait harness for fishhooks which will retain live bait properly positioned adjacent the hooked portion of the fishhook in a live state for an indefinite period of time.

It is still a further object of the present invention to provide a live bait harness for fishhooks which may be designed to be permanently affixed to the fishhook.

It is another object of the present invention to provide a live bait harness for fishhooks which may be easily and conveniently expanded to receive live bait therein and only requires one hand of the fisherman in order to accomplish this expanding operation.

It is still another object of the present invention to provide a live bait harness for fishhooks with which once the bait is positioned in place in the harness, the harness is merely released and will firmly retain the bait in place adjacent the hooked portion of the fishhook.

It is an additional object of the present invention to provide a live bait harness for fishhooks in which the bait may be quickly and easily positioned therein in a minimum period of time without injury to the bait.

These and other objects are accomplished by the parts, construction, arrangements, combinations and subcombinations comprising the present invention, the nature of which is set forth in the following general statement, a preferred embodiment of which—illustrative of the best mode in which applicant has contemplated applying the principles—is set forth in the following description and illustrated in the accompanying drawings, and which is particularly and distinctly pointed out and set forth in the appended claims forming a part hereof.

In general terms the construction of live bait harness for fishhooks may be stated as including a fishhook having a shank portion and an arcuate preferably generally U-shaped hooked portion, and said hooked portion terminating in a preferably sharpened barbed end portion.

The construction of live bait harness for fishhooks also includes two spaced substantially parallel axially aligned preferably wire loops having first or outer and second or inner sides, the second sides of said loops positioned spaced from and extending preferably substantially perpendicularly away from a plane passing through the fishhook shank portion, said plane also preferably passing through the fishhook hooked portion, the loops preferably laterally aligned with the hooked portion end portion, said loops each having oppositely extending crossed shank and pressure portions preferably located at the upper sides thereof, converging preferably arcuate preferably wire shank connecting portions connected to the loop shank portions, means connecting the shank connecting portions to the fishhook shank portion, lateral means preferably including a U-shaped laterally extending wire portion connecting the loop pressure portions, and abutment means preferably including a laterally extending preferably wire member connected to and extending between the second sides of the loops and adapted to abut the fishhook shank portion.

Thus, with the construction of the present invention, pressure may be applied to the loop pressure portions to increase the diameter of the loops and live bait such as a minnow may be inserted therein. Upon release of the pressure, the loops will contract to approach their original diameter and will thereby firmly hold the live minnow positioned adjacent the hooked portion of the fishhook. When the abutment means is provided between the second sides of the loops, pressure on the loop pressure portions will cause the abutment means to bear against the hook shank portions and thereby aid in expanding the loops.

By way of example, an embodiment of the improved construction of live bait harness for fishhooks comprising the present invention is illustrated in the accompanying drawings forming a part hereof, wherein like numerals indicate similar parts throughout the several views and in which:

Fig. 1 is a front side perspective view of the live bait harness mounted on a fishhook;

Fig. 2, a front elevation of the live bait harness mounted on a fishhook with a minnow clamped in the harness; and Fig. 3, a side elevation of the live bait harness mounted on a fishhook.

Although the live bait harness comprising the present invention is illustrated and described in combination with a particular type of fishhook, it should be understood that the live bait harness construction comprising the present invention may be used in combination with various other types of hooks. It should be further understood that the fishhook is not claimed as a part of the present invention other than the combination illustrated and described herein. Still further, it should be understood, although the live bait harness construction shown and described herein is illustrated with and is principally designed for use with live minnows, that the harness may be designed for use with other types of live bait such as frogs or crabs, without departing from the principles of the present invention.

The fishhook illustrated in the drawings in combination with the live bait harness comprising the present invention preferably includes a shank portion 10 and a hooked portion 11. The shank portion 10 terminates upwardly in a ring portion 12, which ring portion is used for fastening the fishhook to a fishing line. Shank portion 10, at its lower end, is formed integral with the hooked portion 11, which hooked portion is preferably arcuate and generally U-shaped in configuration and terminates in the usual sharpened barbed end portion 13.

The live bait harness, generally indicated at 14, preferably is formed of semi-resilient wire and includes loops 15 and 16, shank connecting portions 17 and 18, lateral means 19 and abutment means 20. Loops 15 and 16 are preferably substantially parallel to each other and are axially aligned, with the inner or second sides 15a and 16a, respectively, thereof spaced from and extending perpendicularly away from a plane passing through the longitudinal axis of the fishhook shank portion 10, with said plane also preferably extending through the hooked portion 11. It should be understood, where the term "a plane passing through the fishhook shank portion" is used in the claims, that this term refers to a plane passing through and in substantial alignment with the longitudinal axis of the fishhook shank portion.

Loop 15 is provided at the outer or first side 15b thereof with crossed shank portion 21 and pressure portion 22, and loop 16 is similarly provided at its outer or first side 16b with shank portion 23 and pressure portion 24, with the shank and pressure portions extending in opposite directions. Pressure portions 22 and 24 terminate outwardly away from the loops 15 and 16 in a preferably U-shaped lateral means 19, which lateral means is connected to and preferably formed integral with the pressure portions 22 and 24 and spanning the distance between the ends thereof.

Shank portions 21 and 23 of loops 15 and 16 are connected to and are preferably formed integral with the shank connecting portions 17 and 18. Portions 17 and 18 extend in an arcuate manner and converging towards each other down to the shank portion 10 of the fishhook, and are solidly affixed thereto as by soldering or welding, as indicated at 25.

The second sides 15a and 16a of the loops 15 and 16 are preferably connected by an abutment means 20 which is preferably comprised of a straight piece of wire with the ends thereof welded or soldered in permanent connection to the second sides of the loops 15 and 16, as at 26 and 27. The abutment means 20 is adapted to abut the shank portion 10 of the fishhook, but is not permanently affixed thereto, so that means 20 is free to move in reference to hooked portion 10 of the fishhook.

Thus, with the construction described, pressure may be applied to the lateral means 19 and, since the shank connecting portions 17 and 18 are affixed to the shank portion 10 of the fishhook at 25, this pressure will cause the loops 15 and 16 to expand in diameter. Such expansion is aided by the abutment means 20 bearing against the shank portion 10 of the fishhook, with the abutment means 20 sliding along shank portion 10 as loops 15 and 16 expand in diameter.

After such expansion has taken place, live bait such as a minnow, as shown in Fig. 2, may be inserted in the loops 15 and 16 and thereafter pressure on the lateral means 19 released so that the resiliency of the wire forming the live bait harness 14 causes the loops 15 and 16 to again retract or decrease in diameter tending to approach their original diameter and firmly encircling and retaining the live minnow therein. Loops 15 and 16 are preferably in lateral alignment with the sharpened end portion 13 of the fishhook hooked portion 11 so that when the live minnow is retained in the live bait harness 14, the minnow will extend adjacent the sharpened end portion 13, as shown in Fig. 2.

Also, although it is preferable that the loops 15 and 16 are positioned so that when live bait such as a minnow is retained therein, this live bait will extend adjacent the sharpened end portion 13 of the fishhook hooked portion 11, it may be desirable with certain types of bait or certain types of hooks to provide the loops 15 and 16 in different positions in reference to the hooked portion 11 around the shank portion 10.

Due to the unique construction of the minnow harness 14, the fishhook having the minnow harness mounted thereon, may be placed on a flat surface and, by use of one hand, a fisherman may apply pressure to the lateral portion 19 to expand the loops 15 and 16 and with the other hand insert the live bait within the loops 15 and 16. Thereafter the pressure on lateral member 19 may be released, causing the loops 15 and 16 to contract and firmly retain the live bait therein. Thus, with the live bait harness construction of the present invention, a fisherman may place live bait therein without the aid of other fishermen.

Thus, there is provided a live bait harness for fishhooks which retains the bait properly positioned adjacent the hooked portion of the fishhook but does not require the bait to be pierced by the hooked portion; which will retain live bait properly positioned adjacent the hooked portion of the fishhook in a live state for an indefinite period of time; which may be designed to be permanently affixed to the fishhook; which may be easily and conveniently expanded to receive live bait therein and only requires one hand of the fisherman in order to accomplish this expanding operation; with which the bait is positioned in place in the harness and the harness is merely released to retain the bait in place adjacent the hooked portion of the fishhook; in which the bait may be quickly and easily positioned in a minimum period of time without injury to the bait; and which is simple in construction and easily and economically manufactured.

In the foregoing description, certain terms have been used for brevity, clearness and understanding, but no unnecessary limitations are to be implied therefrom, because such words are used for descriptive purposes herein, and are intended to be broadly construed.

Moreover, the embodiment of the improved construction illustrated and described herein is by way of example, and the scope of the present invention is not limited to the exact details of the construction shown.

Having now described the invention, the construction, operation and use of a preferred embodiment thereof, and the advantageous new and useful results obtained thereby; the new and useful construction and reasonable me-

I claim:

1. A live bait harness for fishhooks having shank portions and generally U-shaped hooked portions, including two spaced axially aligned loops, said loops positioned extending substantially perpendicular to a plane passing through the fishhook shank portion, each loop having oppositely extending crossed shank and pressure portions, converging shank connecting portions connected to the loop shank portions, and means connecting the shank connecting portions to the fishhook shank portion; whereby pressure may be applied to the loop pressure portions to expand the loops, live bait may be inserted in the loops and the pressure on the pressure portions may be released allowing the loops to contract and retain the live bait securely positioned therein.

2. A live bait harness for fishhooks having shank portions and generally U-shaped hooked portions, including two spaced substantially parallel axially aligned loops having first and second sides, the second sides of said loops positioned spaced from and extending away from a plane passing through the fishhook shank portion, said loops each having oppositely extending crossed shank and pressure portions at the first side, converging shank connecting portions connected to the loop shank portions, and means connecting the shank connecting portions to the fishhook shank portion; whereby pressure may be applied to the loop pressure portions to expand the loops, live bait may be inserted in the loops and the pressure on the pressure portions may be released allowing the loops to contract and retain the live bait securely positioned therein.

3. Live bait harness construction as defined in claim 2 in which the shank connecting portions extend arcuately between the loop shank portions and the fishhook shank portion.

4. Live bait harness construction as defined in claim 2 in which lateral means laterally connects the pressure portions of the two loops.

5. Live bait harness construction as defined in claim 2 in which abutment means is connected to and extends between the second sides of the loops and is adapted to abut the fishhook shank portion.

6. Live bait harness construction as defined in claim 2 in which the second sides of the loops are positioned spaced from and the loops extend substantially perpendicularly away from a plane passing through the fishhook shank portion and hooked portion.

7. A live bait harness for fishhooks having shank portions and generally U-shaped hooked portions, including two spaced substantially parallel axially aligned loops having first and second sides, the second sides of said loops positioned spaced from and extending away from a plane passing through the fishhook shank portion, said loops each having oppositely extending crossed shank and pressure portions at the first sides thereof, converging arcuate shank connecting portions connected to the loop shank portions, means connecting the shank connecting portions to the fishhook shank portion, a U-shaped laterally extending portion connecting the loop pressure portions, and a laterally extending abutment member connected to and extending between the second sides of the loops and adapted to abut the fishhook shank portion; whereby pressure may be applied to the U-shaped laterally extending portion to expand the loops while the abutment member resists movement of the loops toward the fishhook shank portion, live bait may be inserted in the loops and the pressure on the U-shaped laterally extending portion may be released allowing the loops to contract and retain the live bait securely positioned therein.

8. A live bait harness for fishhooks having shank portions and generally U-shaped hooked portions with the hooked portions terminating in sharpened barbed end portions, including two spaced substantially parallel axially aligned loops having first and second sides, the second sides of said loops positioned spaced from and extending substantially perpendicularly away from a plane passing through the fishhook shank portion and hooked portion, said loops laterally aligned with the hooked portion end portion, said loops each having oppositely extending crossed shank and pressure portions at the first sides thereof, converging arcuate shank connecting portions connected to the loop shank portions, means connecting the shank connecting portions to the fishhook shank portion, a U-shaped laterally extending portion connecting the loop pressure portions, and a laterally extending abutment member connected to and extending between the second sides of the loops and adapted to abut the fishhook shank portion; whereby pressure may be applied to the U-shaped laterally extending portion to expand the loops while the abutment member resists movement of the loops toward the fishhook shank portion, live bait may be inserted in the loops and the pressure on the U-shaped laterally extending portion may be released allowing the loops to contract and retain the live bait securely positioned therein extending adjacent the fishhook hooked portion end portion.

References Cited in the file of this patent

UNITED STATES PATENTS

| | | |
|---|---|---|
| 527,740 | Wright | Oct. 16, 1894 |
| 841,951 | Evans | Jan. 22, 1907 |
| 1,464,571 | Hanson | Aug. 14, 1923 |
| 2,402,730 | Bucks | Jan. 25, 1946 |